Jan. 1, 1924
E. R. WOLCOTT
1,479,271
METHOD AND APPARATUS FOR SEPARATING SUSPENDED PARTICLES FROM GASES
Filed Dec. 15, 1919  3 Sheets-Sheet 1
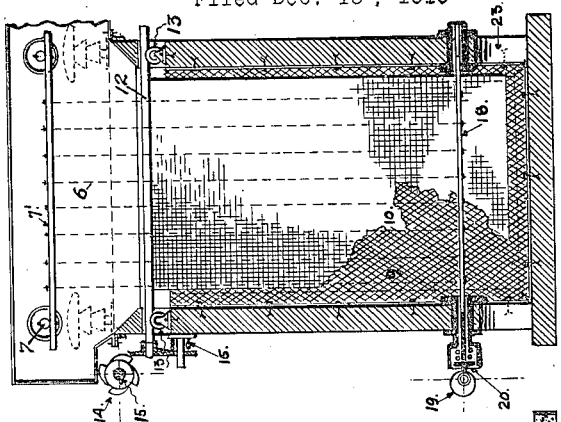
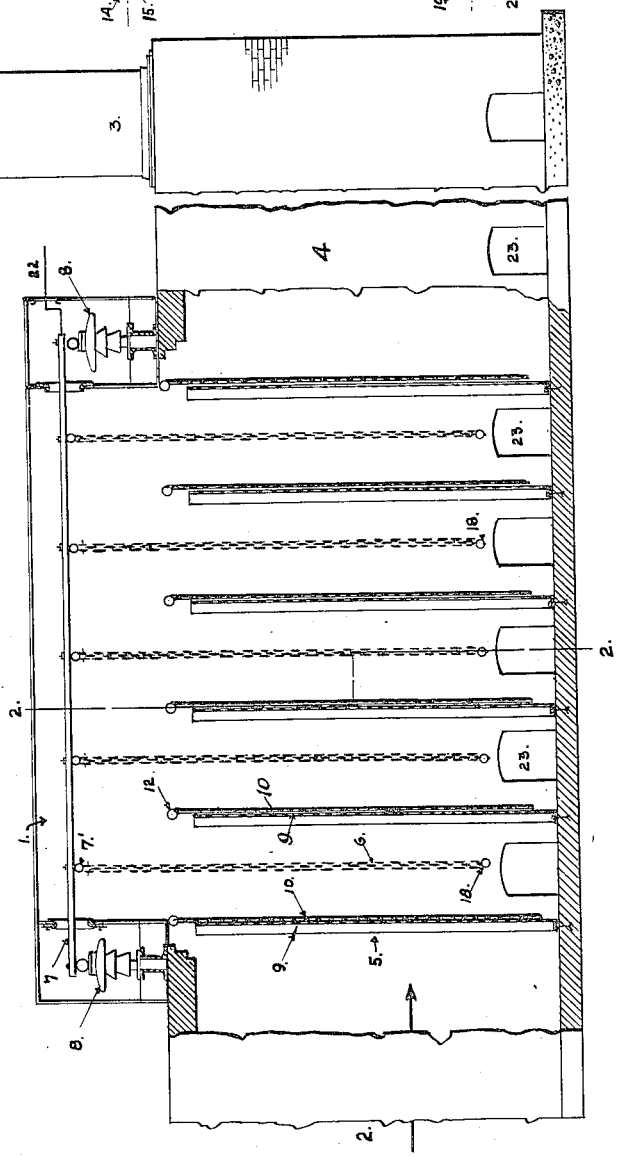
INVENTOR
Edson R. Wolcott
BY
Arthur P. Knight
ATTORNEY

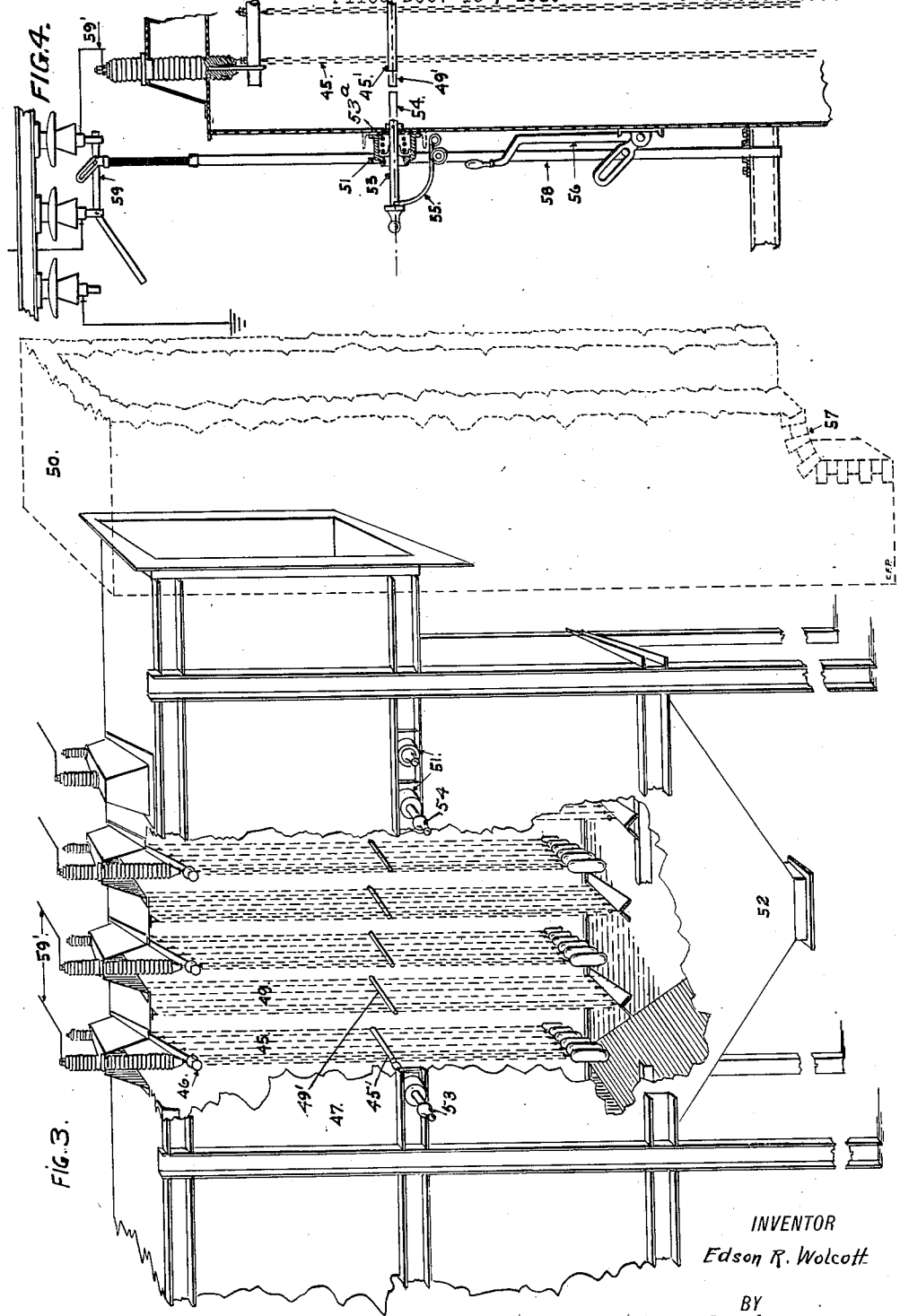

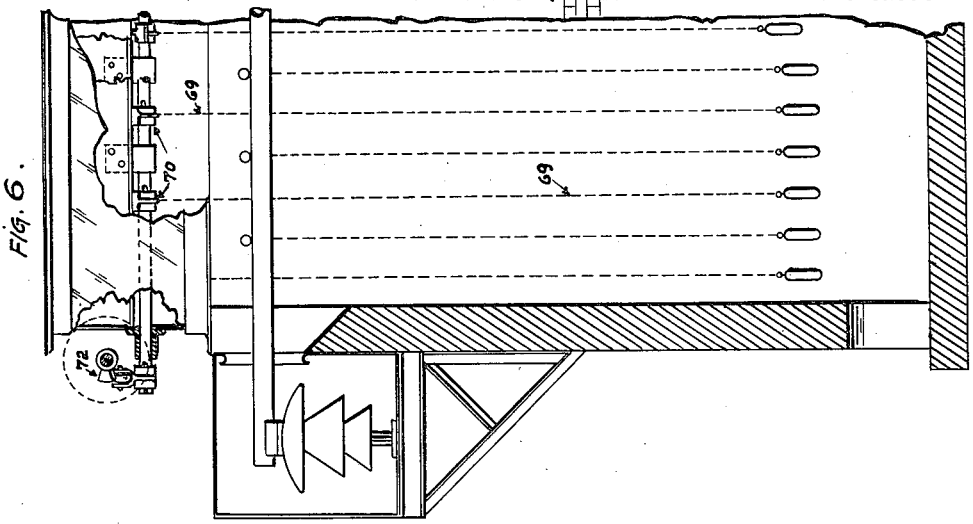
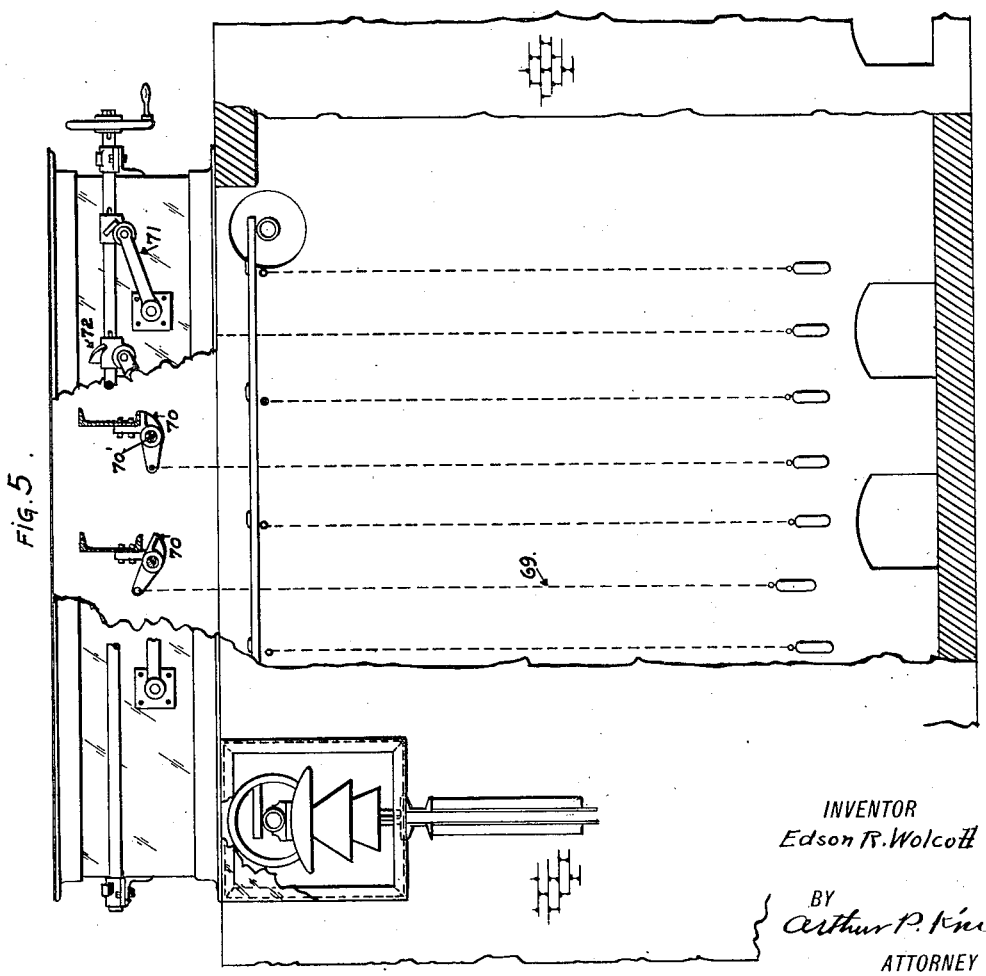

Patented Jan. 1, 1924.

1,479,271

UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD AND APPARATUS FOR SEPARATING SUSPENDED PARTICLES FROM GASES.

Application filed December 15, 1919. Serial No. 345,026.

*To all whom it may concern:*

Be it known that I, EDSON R. WOLCOTT, a citizen of the United States, residing at Los Angeles, in the county of Los Angeles and State of California, have invented a new and useful Method and Apparatus for Separating Suspended Particles from Gases, of which the following is a specification.

This invention relates to the separation of suspended fume, dust, or other suspended material, from gases, such as flue or furnace gases, and the main object of the present invention is to provide improved means for effecting such separation by the aid of electrical action, in such manner as to reduce to a minimum the expense of installation and operation.

In electrical precipitators as generally constructed it is usual to cause the gases to pass between or parallel to the electrodes on which the material is deposited, and in order to provide for large capacity, the electrodes must be of large area and the gas passages must also be of large cross section transverse of the gas stream. It has been found that by constructing the precipitator in such manner that the gases to be treated pass through the collecting electrodes, it is possible to provide for a relatively large gas flow and at the same time provide for extended area of collecting electrodes in a treater of relatively small size. In such apparatus it is especially desirable to provide for removal of the material collecting on the electrodes so as to prevent undue obstruction to the gas stream, and my invention is directed particularly to such removal of the deposited material.

The accompanying drawings illustrate embodiments of my invention, and referring thereto:

Fig. 1 is a longitudinal vertical section of one form of the precipitator, comprising electrodes formed as screens; and Fig. 2 is a transverse section on line 2—2 in Fig. 1 with parts broken away;

Fig. 3 is a perspective view of a form of the invention in which groups of wires or chains are used in forming the transverse electrodes, alternate groups being at high tension and intervening groups being grounded;

Fig. 4 is a partial vertical section of the treater shown in Fig. 3;

Fig. 5 is a partial longitudinal section showing electrodes adapted to be moved or vibrated vertically, for cleaning;

Fig. 6 is a section of the apparatus shown in Fig. 5.

The apparatus shown in Figs. 1 and 2 comprises a flue or elongated chamber 1 extending horizontally from an inlet 2 to an outlet 3, and electrode means mounted within said chamber for effecting electrical precipitation therein, a portion 4 of said flue or chamber following said electrode means being adapted to act as a settling chamber.

The electrode means aforesaid comprises, in the form shown in Figs. 1 and 2, grounded electrodes 5 and discharge electrodes 6, which are maintained at high electrical potential, said electrodes 6 being formed as wires, chains or screens, hung by rods or bars 7 from a frame 7', mounted on insulators 8. A series or plurality of grounded electrodes 5 are provided, alternating with the high tension electrodes 6. Each grounded electrode 5 may comprise two elements 9 and 10, which are relatively movable in directions parallel to the plane of said electrodes to effect cleaning thereof. For this purpose, the element 9 may consist of a vertical screen of wire mesh or similar material extending transversely of the flue 1 and completely across the same from side to side and from top to bottom and mounted rigidly in the flue, and the element 10 may consist of a similar screen mounted in contact with the element 9 and adapted to move laterally thereon, for example, in a horizontal direction. The electrode 10 may be supported on a bar 12 sliding in guideways 13 and operated by tappet or knocking means 14 on a shaft 15 driven in any suitable manner, a spring 16 being provided to return the electrode element 10 suddenly to normal position when released from the action of said tappet means.

The discharge electrodes 6 may consist of wires or chains arranged in rows, preferably vertical, as shown, and connected at their upper ends to the insulated frame 7, and at their lower ends to a bar 18, which is reciprocated by operating means 19 through an insulating means 20 so as to vibrate or oscillate the discharge electrodes in such manner as to dislodge therefrom material precipitated thereon.

The high tension or discharge electrodes 6 may be connected by wire 22 to a suitable source of high electric potential, for example, to a high tension alternating current, either directly or through rectifying means, so as to cause either alternating or unidirectional electrical field to be produced between the electrodes 6 and the grounded electrodes 5, it being understood that the source of electric potential has also grounded connections to complete the circuit and enable alternating or direct current, as the case may be, to pass in the circuit including said electrodes.

My invention may be carried out in the above described apparatus as follows: The gases to be treated and containing suspended material, such as fume, dust, smoke, etc., are passed through flue 1 in the direction of the arrow in Fig. 1 so as to pass successively through the respective sets of electrodes 5 and 6 and are thereby subjected to electrical action in such manner as to cause precipitation or collection of the suspended material on said electrodes and on the bottom and walls of the flue. As the material collects on the electrodes in this manner there is a tendency for some of the collected material to be dislodged by the action of the gas stream and to be carried forward by the current of gas into the settling chamber, wherein it is deposited by the action of gravity. The material passing to the settling chamber generally consists of relatively large and heavy masses resulting from agglomeration of the particles in the electrical fields between electrodes 5 and 6, or from cohering of the particles as they are precipitated on the electrodes, and are subsequently detached in flakes or comparatively large masses. It is possible with some fumes or dusty gases to so carry out the process that the amount of material detached from the electrodes by the action of the gas stream is equivalent to the amount being deposited on the electrodes and to cause the material so detached to be deposited by gravity either in the bottom of the electrode chamber or flue portion, or in the succeeding settling chamber 4, and in such cases no special cleaning means is required for the electrodes, the same being self-cleaning by the action of the gas flow. In other cases, it is desirable to provide for assisting the removal of the material from the electrodes. In such cases, the cleaning means shown in Fig. 1 may be put into operation, the grounded screen members 10 being vibrated or reciprocated by the means shown to cause collected material to be dislodged therefrom by the vibration and by the rubbing together of the surfaces of the members 10 and 9; each of the screen members operating as a brushing means for the other screen member, the operation of the jarring means serving to jar or agitate both of such screen members, and the high tension electrodes may also be vibrated by the means shown so as to shake the chains or wires or screens constituting such electrodes and thereby dislodge material therefrom. The material so dislodged from the grounded electrodes and from the high tension electrodes is carried forward by the gas stream and is, in general, sufficiently coarse or agglomerated to be caused to settle by gravitative action to the bottom of the precipitating chamber or of the settling chamber, and may be removed therefrom in any suitable manner, for example, by withdrawing the same through openings 23.

In the form of the invention shown in Figs. 3 and 4 a series of groups or sets of electrodes is provided, alternate groups being maintained at high potential and low potential, respectively. The high potential electrodes indicated at 45 may consist of wires or chains suspended from suitable insulated supports 46 and arranged in a row extending transversely of the flue 47 through which the gases to be treated are passed. The low potential electrodes may consist of a similar set of chains or wires 49 extending vertically and arranged in a row transversely of the flue 47, the arrangement being such that the gases pass successively through the respective sets 45 and 49 and alternately through high potential and low potential sets. The flue 47 is provided with a settling chamber portion 50 behind the sets of electrodes aforesaid and between said sets of electrodes and the discharge flue or stack. By suitably proportioning the dimensions of the flue 47 and the spacing of the electrodes 45 and 49 a considerable portion, or, in some cases, substantially all of the material deposited or collected on these electrodes may be blown or swept off by the action of the gas stream and carried forward into the settling chamber 50 in comparatively large flakes or masses capable of settling in said chamber by gravitative action. If found desirable, however, in any particular case, suitable means may be provided for forcibly dislodging the collected material from the electrodes 45 and 49, for example, hammer means, indicated at 53 and 54, may be provided adapted to jar the respective sets of electrodes 45 and 49, so as to jar said electrodes sufficiently to dislodge the collected material therefrom. In the operation of this form of the invention, as well as in the forms above described, the action of the electrical field produced at the electrodes causes electrical precipitation of suspended material on the surfaces of both the high potential electrodes 45 and the grounded electrodes 49, and the material so collected is removed continuously or intermittently by the action of the gas stream assisted by the hammer means, and is collected in suitable receiving means 52 at the bottom of the electrode containing portion of the flue and any amount which is carried forward into the settling chamber 50 separates by gravitative action to a greater or less extent in the chamber 50 and is removed from time to time by suitable means, for example, through openings 57.

Hammer means 53 and 54 may consist of members slidable in guides 51 in the walls of the flue 47 and adapted to strike bars 45' and 49' on the respective electrodes. The hammer means 53 are normally held away from the high tension electrodes by a spring 53ª and are locked in this position by a lock 55 which is released by a lever 56 and bar 58, which also operates to open switch 59 during the cleaning operation, said switch being included in the connection 59' to the high tension energizing circuit.

Either the high tension or the low tension electrodes may be cleaned by any suitable means and particularly in the case of chains by imparting motion thereto by vibrating or shaking the same in any manner so as to cause relative motion between the links of the chains, thus, as shown in Figs. 5 and 6, the low tension electrodes 69 may be carried by levers 70 on a rock shaft 70' having an arm 71, operated by cam means 72 for periodically lifting and dropping the electrodes. As shown in Fig. 17, the high tension electrodes, indicated at 77, may be mounted to rotate on a vertical axis 78 and operated through suitable connections 79 including an insulator 80, so as to cause the electrodes 77 to oscillate around its vertical axis, thereby causing relative movement of the links of the chain constituting said electrode.

In all the above described forms of my invention high tension or insulated electrode systems may be supplied with current presenting high potential difference between the said high tension electrode systems and the grounded electrodes or the flue as the case may be by connection to any suitable source of high tension current, either unidirectional or alternating and either continuous or intermittent. In some cases, it is desirable to connect the said high tension electrodes through a suitable high tension mechanical rectifier to a high tension alternating current circuit, said rectifier being operated in synchronism with the current in said circuit so as to supply unidirectional high tension current impulses to said electrodes. In other cases, it will be sufficient to connect the said high tension or insulated electrodes directly to a high tension alternating current circuit so that an alternating electric field is maintained adjacent to said electrodes and the polarity of each electrode is alternately positive and negative. Inasmuch as the operation of the above described devices is primarily by agglomeration of the suspended particles, the said apparatus is especially adapted for operation with alternating current in this manner. The frequency of alternation may be of the low frequency usual in alternating current circuits, or it may be high frequency or oscillatory current, such as may be produced by an oscillation circuit, in the usual manner in apparatus for producing high frequency discharge or electromagnetic waves.

In the above described embodiments of my invention shown in Figs. 3 to 6 both the collecting and discharge electrodes are shown as rods, wires or chains constituting flexible vertical elongated members of small transverse cross section arranged in rows or groups extending transversely of the flue through which the gases pass, each row or group constituting in effect a pervious electrode extending transversely of the flue, so that the gases to be treated pass through the electrode.

What I claim is:

1. An electrical precipitator comprising a flue adapted for passage of gases therethrough, grounded collecting electrodes, each consisting of a single row of vertical elongated flexible members of small transverse cross sections extending transversely in said flue, and insulated discharge electrodes each consisting of a single row of vertical flexible members of small transverse cross sections extending transversely in said flue, between and in alternation with the collecting electrodes.

2. An electrical precipitator comprising a flue adapted for passage of gases therethrough, a plurality of grounded electrodes consisting of vertical elongated members, arranged in rows transversely of the flue, and a plurality of insulated electrodes arranged in between successive rows of grounded electrode members and consisting of vertical elongated members of small transverse cross sections arranged in rows transversely of the flue.

3. In an apparatus for separating suspended particles from gases, vertically extending collecting electrode means, vertically extending discharge electrode means extending opposite the collecting electrode means and mounted to be movable laterally and means for effecting lateral movement of the discharge electrode means.

4. The method of separating suspended particles from gases, which consists in passing the gases in contact with electrode surfaces maintained at high electrical potential to cause deposition of suspended particles on said surfaces, causing the gas stream to flow past said surfaces with sufficient velocity to dislodge particles so precipitated, carrying the particles so dislodged forward with the gas stream, and subjecting the particles so carried forward to a separating action dependent on the mass of the particles.

5. A method, according to claim 5, wherein said separating action is effected by gravitative settling of the particles subsequently to the passage of same past said electrodes.

6. A method, according to claim 5, wherein the electrodes are subjected to continual mechanical cleaning action to continually dislodge collected material therefrom and enable such dislodged material to be carried forward by the gas stream.

7. An apparatus for separating suspended particles from gases, comprising a flue, a series of pervious electrodes mounted in and insulated from said flue and extending transversely of the flue and provided with means for maintaining same at high electrical potential, a series of grounded electrodes mounted in said flue and extending transversely of the flue in such manner that the gases passing in the flue pass successively through high potential and grounded electrodes, and means for moving said electrodes transversely of the flue to dislodge material therefrom.

In testimony whereof I have hereunto subscribed my name this 4th day of December, 1919.

EDSON R. WOLCOTT.